United States Patent
Sakurabu

(10) Patent No.: US 9,703,070 B2
(45) Date of Patent: Jul. 11, 2017

(54) IMAGING APPARATUS AND FOCUSING CONTROL METHOD

(71) Applicant: FUJIFILM Corporation, Tokyo (JP)

(72) Inventor: Hitoshi Sakurabu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 53 days.

(21) Appl. No.: 14/825,678

(22) Filed: Aug. 13, 2015

(65) Prior Publication Data
US 2015/0346585 A1 Dec. 3, 2015

Related U.S. Application Data

(63) Continuation of application No. PCT/JP2013/079888, filed on Nov. 5, 2013.

(30) Foreign Application Priority Data

Feb. 14, 2013 (JP) .................................. 2013-026862

(51) Int. Cl.
*H04N 5/232* (2006.01)
*G02B 7/38* (2006.01)
(Continued)

(52) U.S. Cl.
CPC .............. *G02B 7/38* (2013.01); *G03B 13/36* (2013.01); *H04N 5/2351* (2013.01);
(Continued)

(58) Field of Classification Search
CPC ............. H04N 5/23212; H04N 5/2351; H04N 5/2352; H04N 9/753; G03B 13/36; G02B 7/38; G02B 7/36
See application file for complete search history.

(56) References Cited

U.S. PATENT DOCUMENTS 5,115,262 A * 5/1992 Komiya ............. H04N 5/23212
348/352
7,880,800 B2 * 2/2011 Sasaki .................... G02B 7/282
348/345
(Continued)

FOREIGN PATENT DOCUMENTS

CN 101047348 A 10/2007
CN 102141717 A 8/2011
(Continued)

OTHER PUBLICATIONS

International Search Report, issed in PCT/JP2013/079888, mailed on Feb. 10, 2014.
(Continued)

*Primary Examiner* — Luong T Nguyen
(74) *Attorney, Agent, or Firm* — Birch, Stewart, Kolasch & Birch, LLP

(57) ABSTRACT

Provided is an imaging apparatus capable of performing AF with a high precision regardless of an object while realizing increase in AF speed. When there is an AF instruction, photographing is performed while a focus lens is moved. AF evaluated values are calculated at every position of the focus lens by a contrast AF processing unit. The contrast AF processing unit calculates a sharpness in the vicinity of the maximal point of an evaluated value curve from three AF evaluated values, including the maximum value among calculated AF evaluated values and AF evaluated values calculated at positions in front and rear of a focus lens position corresponding to the maximum value, and position information of the focus lens corresponding thereto, and calculates a focusing position by a calculation method selected from among plural kinds of methods according to the sharpness.

7 Claims, 8 Drawing Sheets

(51) Int. Cl.
    *H04N 5/235*    (2006.01)
    *H04N 9/73*     (2006.01)
    *G03B 13/36*    (2006.01)
(52) U.S. Cl.
    CPC ....... *H04N 5/2352* (2013.01); *H04N 5/23212* (2013.01); *H04N 9/735* (2013.01)

(56) References Cited

U.S. PATENT DOCUMENTS

| | | | | |
|---|---|---|---|---|
| 8,004,597 B2 * | 8/2011 | Cheng | ...................... | G02B 7/28 348/208.12 |
| 2009/0091633 A1 * | 4/2009 | Tamaru | .................... | G02B 7/38 348/208.14 |
| 2011/0001870 A1 * | 1/2011 | Yamamoto | ............... | G02B 7/38 348/351 |

FOREIGN PATENT DOCUMENTS

| | | |
|---|---|---|
| EP | 2 007 135 A2 | 12/2008 |
| JP | 2004-279721 A | 10/2004 |
| JP | 2005-345695 A | 12/2005 |
| JP | 2009-27212 A | 2/2009 |

OTHER PUBLICATIONS

Chinese Office Action for CN Application No. 201380073094.9 dated Dec. 26, 2016 (with English Translation).

\* cited by examiner

IMAGING APPARATUS AND FOCUSING CONTROL METHOD

CROSS REFERENCE TO RELATED APPLICATION

This is a continuation of International Application No. PCT/JP2013/079888 filed on Nov. 5, 2013, and claims priority from Japanese Patent Application No. 2013-026862, filed on Feb. 14, 2013, the entire disclosures of which are incorporated herein by reference.

BACKGROUND

1. Technical Field

The present invention relates to an imaging apparatus having an auto-focus function.

2. Related Art

Recently, as the high resolution of a solid imaging element such as a CMOS (Charge Coupled Device image sensor or a CMOS (Complementary Metal Oxide Semiconductor image sensor has been attained, a demand for information devices having a photographing function such as a digital still camera, a digital video camera, a cellular phone (e.g., a smart phone), and a personal digital assistant (PDA) is rapidly increasing. Meanwhile, information appliances having an imaging function as described above are referred to as imaging apparatuses.

The imaging apparatuses employ a contrast auto-focus (AF) method or a phase difference AF method as a focusing control method for focusing on a main object.

The contrast AF method is a method for acquiring a picked-up image contrast, obtained in each driving step, as an evaluated value while moving a focus lens in the optical axis direction, and setting a lens position having the highest evaluated value as a focusing position.

Here, the focus lens refers to a lens that moves in the optical axis direction to adjust the focal distance of a photographing optical system. In a lens unit including a plurality of lenses, the focus lens indicates a lens that adjusts a focal position. In the case where the entire group of lenses extends, the focus lens indicates all the entire group.

There are various methods for determining a lens position having the maximum evaluated value. For example, Patent Literature 1 (JP-A-2005-345695) discloses a method for calculating a lens position (focusing position) corresponding to a maximal point of an evaluated value curve by performing a so-called three-point interpolation calculation with respect to three points (a plotted point P2 of the maximum value (the maximum evaluated value) among obtained evaluated values, a plotted point P1 of an evaluated value obtained before the maximum evaluated value, and a plotted point P3 of an evaluated value obtained after the maximum evaluated value) in a graph in which the horizontal axis represents a lens position and the vertical axis represents an evaluated value. Specifically, the focusing position is obtained from an intersection between a straight line that passes through the point P2 and the point P3 and has a gradient of a and a straight line that passes through the point P1 and has a gradient of −α.

In addition, Patent Literature 2 (2004-279721) discloses a method for determining a function of a curve passing through the three points and calculating a lens position corresponding to a maximal point of an evaluated value curve from the function. A spline function or a Bezier function is used as the function.

SUMMARY OF INVENTION

The method disclosed in Patent Literature 2 is capable of determining a focusing position having a small error when the vicinity of the maximal point of a real evaluated value curve has a gently sloping mountain shape. In addition, the method is advantageous in increasing an AF speed because it enables calculation of the focusing position with a high precision even if the sampling number of evaluated values is small.

However, some photographed objects may have a steep mountain shape in the vicinity of the maximal point of the evaluated value curve. For example, in a landscape scene including a tree with many leaves, the vicinity of the maximal point of the evaluated value curve has a steep mountain shape because the frequency band of an image approaches a high frequency side. In particular, since many recent imaging apparatuses are equipped with a wide-angle lens, the vicinity of the maximal point of the evaluated value curve is easy to become steep by the influence of the wide-angle lens. In addition, in a recent camera, the vicinity of the maximal point of the evaluated value curve tends to easily become steep because the brightness of a lens increases.

As described above, when the vicinity of the maximal point of the evaluated value curve has a steep mountain shape, the evaluated value curve may be considerably different from an assumed curve shape in the method for estimating the maximal point of the evaluated value curve by the function of the curve as described in Patent Literature 2. Therefore, an error in obtained focusing position increases.

The method for obtaining a focusing position using the gradients of straight lines as described in Patent Literature 1 may obtain a focusing position with a certain precision regardless of the shape of the evaluated value curve. However, this method tends to exhibit an increased error as the sampling number of evaluated values decreases in order to improve an AF speed.

In view of above, illustrative aspects of the present invention is to provide an imaging apparatus and a focusing control method which are capable of performing AF with a high precision regardless of a photographed object.

An aspect of the present invention provides an imaging apparatus including: a focus lens configured to be movable in an optical axis direction; an imaging element configured to image an object via the focus lens; an evaluated value calculation unit configured to calculate an evaluated value for focusing using a picked-up image signal obtained through imaging by the imaging element at every position of the focus lens while moving the focus lens; a sharpness calculation unit configured to calculate a sharpness in a vicinity of a maximal point of an evaluated value curve, which represents relationship between a position of the focus lens and the evaluated value, using at least three evaluated values calculated by the evaluated value calculation unit and position information of the focus lens corresponding to each of the three evaluated values; a focusing position calculation unit configured to select, according to at least the sharpness calculated by the sharpness calculation unit, one of plural kinds of calculation methods using the three evaluated values and the position information of the focus lens corresponding to each of the three evaluated values, and to calculate the position of the focus lens corresponding to the maximal point of the evaluated value curve as a focusing position using the selected calculation method; and a focusing control unit configured to perform a focusing control to move the focus lens to the focusing position, in which the calculation methods include: a first calculation method for calculating a second or higher degree function representing the evaluated value curve using the three evaluated values and the position information of the focus lens corresponding to each of the three evaluated values, and calculating the focusing position using the second or higher degree function; and a second calculation method for calculating a first degree function using the three evaluated values and the position information of the focus lens corresponding to each of the three evaluated values and calculating the focusing position using the first degree function, and in which the three evaluated values include a maximum value among the evaluated values calculated by the evaluated value calculation unit and evaluated values calculated in relation with positions in front and rear of the position of the focus lens corresponding to the maximum value.

Another aspect of the present invention provides a focusing control method by an imaging apparatus having an imaging element configured to perform imaging of an object via a focus lens that is movable in an optical axis direction, the method including: an evaluated value calculation step of calculating an evaluated value for focusing using a picked-up image signal obtained through imaging by the imaging element at every position of the focus lens while moving the focus lens; a sharpness calculation step of calculating a sharpness in a vicinity of a maximal point of an evaluated value curve, which represents relationship between a position of the focus lens and the evaluated value, using at least three evaluated values calculated by the evaluated value calculation unit and position information of the focus lens corresponding to each of the three evaluated values; a focusing position calculation step of selecting, according to at least the sharpness calculated by the sharpness calculation unit, one of plural kinds of calculation methods using the three evaluated values and the position information of the focus lens corresponding to each of the three evaluated values, and calculating the position of the focus lens corresponding to the maximal point of the evaluated value curve as a focusing position using the selected calculation method; and a focusing control step of performing a focusing control to move the focus lens to the focusing position, in which the calculation methods include: a first calculation method for calculating a second or higher degree function representing the evaluated value curve using the three evaluated values and the position information of the focus lens corresponding to each of the three evaluated values, and calculating the focusing position using the second or higher degree function; and a second calculation method for calculating a first degree function using the three evaluated values and the position information of the focus lens corresponding to each of the three evaluated values and calculating the focusing position using the first degree function, and in which the three evaluated values include a maximum value among the evaluated values calculated by the evaluated value calculation unit and evaluated values calculated in relation with positions in front and rear of the position of the focus lens corresponding to the maximum value.

According to any one of the aspects of the present invention, it is possible to provide an imaging apparatus and a focusing control method which are capable of performing AF with a high precision regardless of a photographing object.

DESCRIPTION OF EMBODIMENTS

Hereinafter, exemplary embodiments of the present invention will be described with reference to the drawings.

Figure 1:
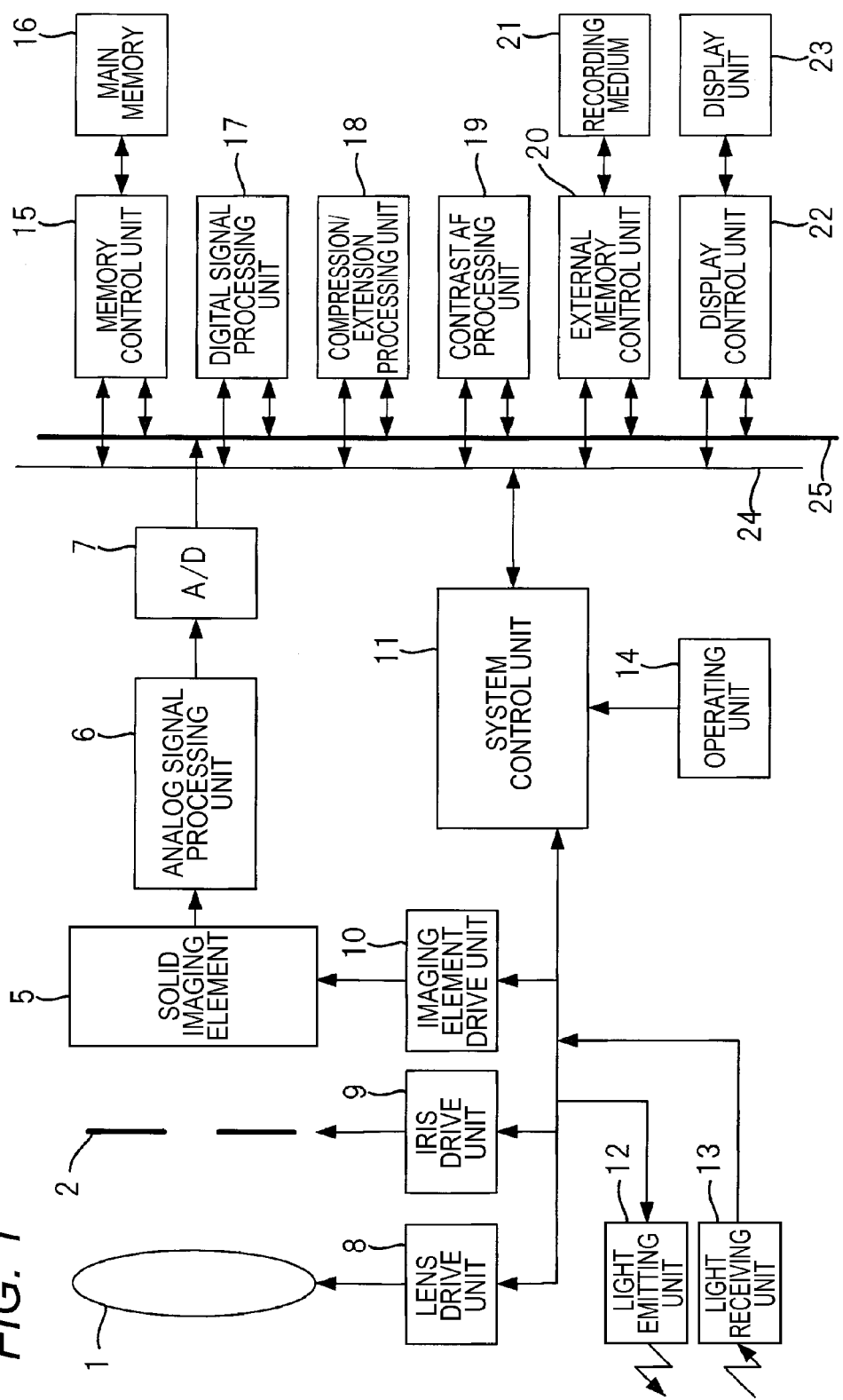
FIG. 1 is a view illustrating a schematic configuration of a digital camera as one example of an imaging apparatus for explaining an exemplary embodiment of the present invention.

FIG. 1 is a view illustrating a schematic configuration of a digital camera as one example of an imaging apparatus for explaining an exemplary embodiment of the present invention.

An imaging system of the digital camera illustrated in FIG. 1 includes an imaging optical system (including a photographing lens 1 and an iris 2) and a solid imaging element 5 such as a CCD type or CMOS type element. The imaging optical system including the photographing lens 1 and the iris 2 is removably coupled or fixed to a camera main body. The photographing lens 1 includes a focus lens that is movable in the optical axis direction. The solid imaging element 5 is not equipped with an optical low-pass filter and, thus achieves a high resolution.

A system control unit 11 that totally controls the entire electric control system of the digital camera controls a flash light emitting unit 12 and a light receiving unit 13. In addition, the system control unit 11 controls a lens drive unit 8 so as to adjust the position of the focus lens included in the photographing lens 1. In addition, the system control unit 11 controls the opening degree of the iris 2 through an iris drive unit 9, thereby adjusting the quantity of exposure.

In addition, the system control unit 11 drives the solid imaging element 5 via an imaging element drive unit 10 and outputs, as a picked-up image signal, an object image obtained via the photographing lens 1. An instruction signal is input by a user to the system control unit 11 via an operating unit 14.

In addition, the electric control system of the digital camera includes an analog signal processing unit 6 that performs an analog signal processing such as a correlative double sampling processing connected to an output of the solid imaging element 5, and an A/D conversion circuit 7 that converts an analog signal, output from the analog signal processing unit 6, into a digital signal. The analog signal processing unit 6 and the A/D conversion circuit 7 are controlled by the system control unit 11. The analog signal processing unit 6 and the A/D conversion circuit 7 may be mounted in the solid imaging element 5.

In addition, the electric control system of the digital camera includes a main memory 16, a memory control unit 15 connected to the main memory 16, a digital signal processing unit 17 that produces photographed image data by performing, for example, an interpolation calculation, a gamma revision calculation, and an RGB/YC conversion processing on a picked-up image signal output from the A/D conversion circuit 7, a compression/extension processing unit 18 that compresses image data produced in the digital signal processing unit 17 in a JPEG form or extends compressed image data, a contrast AF processing unit 19, an external memory control unit 20 connected to a freely removable recording medium 21, and a display control unit 22 connected to a display unit 23 that is mounted to, for example, the rear surface of the camera. The memory control unit 15, the digital signal processing unit 17, the compression/extension processing unit 18, the contrast AF processing unit 19, the external memory control unit 20, and the display control unit 22 are connected to one another via a control bus 24 and a data bus 25, and are controlled by a command from the system control unit 11.

Figure 2:
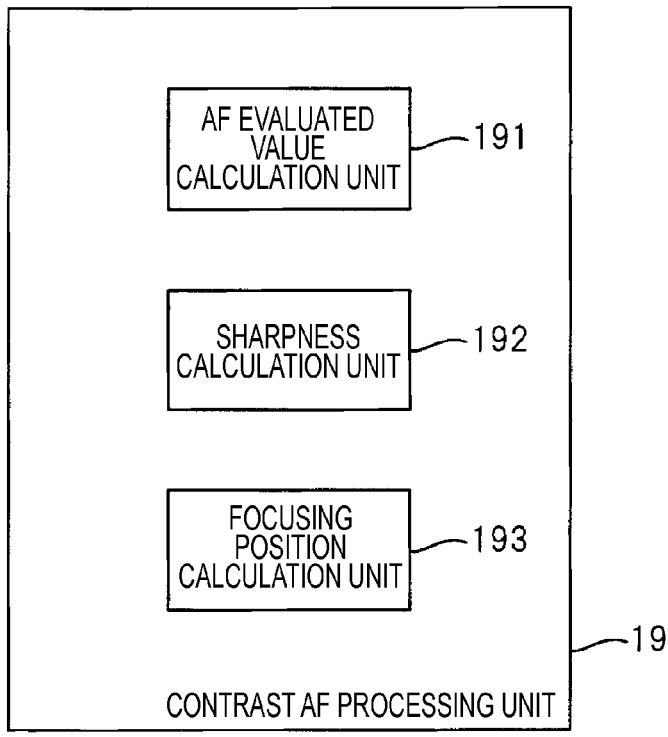
FIG. 2 is a functional block diagram of a contrast AF processing unit 19 in the digital camera illustrated in FIG. 1.

FIG. 2 is a functional block diagram of the contrast AF processing unit 19 in the digital camera illustrated in FIG. 1.

The contrast AF processing unit 19 includes an AF evaluated value calculation unit 191, a sharpness calculation unit 192, and a focusing position calculation unit 193. These functional blocks are formed as a processor included in the system control unit 11 executes a program.

The AF evaluated value calculation unit 191 calculates an AF evaluated value for focusing using a picked-up image signal obtained via imaging using the solid imaging element 5 at every moved position (at three or more positions) while moving the focus lens position of the imaging lens 1 under the control of the system control unit 11. The AF evaluated value is obtained, for example, by multiplying brightness differences between neighboring respective pixels (photoelectric conversion elements) of the solid imaging element 5. Alternatively, the AF evaluated value may be obtained by extracting high frequency components of an image output from the imaging element using a high frequency transmission filter and multiplying the extracted high frequency components.

The sharpness calculation unit 192 calculates the sharpness in the vicinity of the maximal point of the evaluated value curve (a point where an evaluated value becomes the maximum), which represents the relationship between the focus lens position and the AF evaluated value for an object that is being photographed, using at least three AF evaluated values, including the maximum value among AF evaluated values calculated by the AF evaluated value calculation unit 191 and two AF evaluated values calculated in relation to positions in front and rear of the focus lens position corresponding to the maximum AF evaluated value, and the focus lens position information corresponding to each of the three AF evaluated values.

Figure 3:
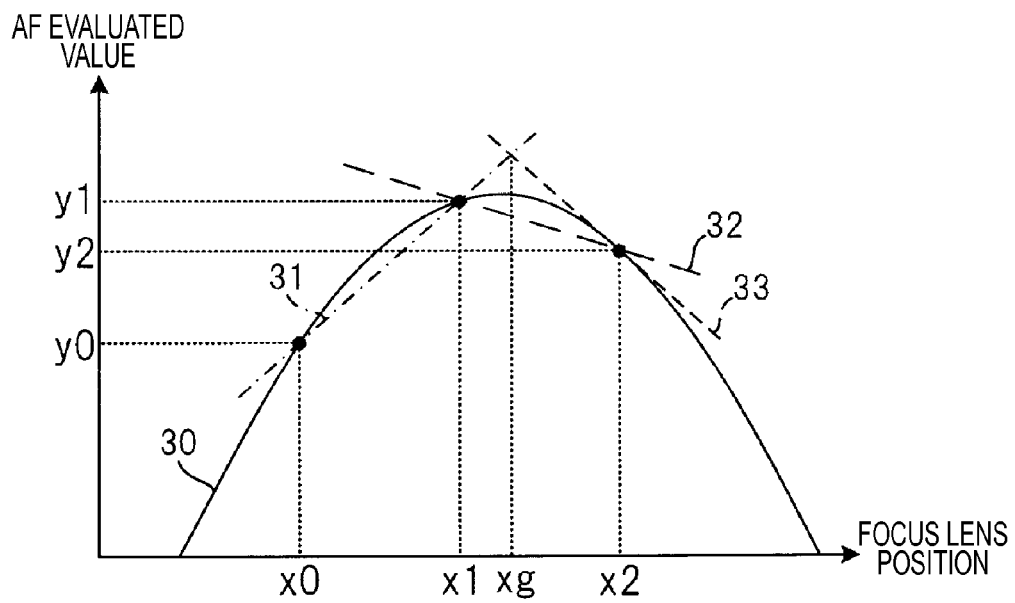
FIG. 3 is a view illustrating one example of an AF evaluated value curve.
Figure 4:
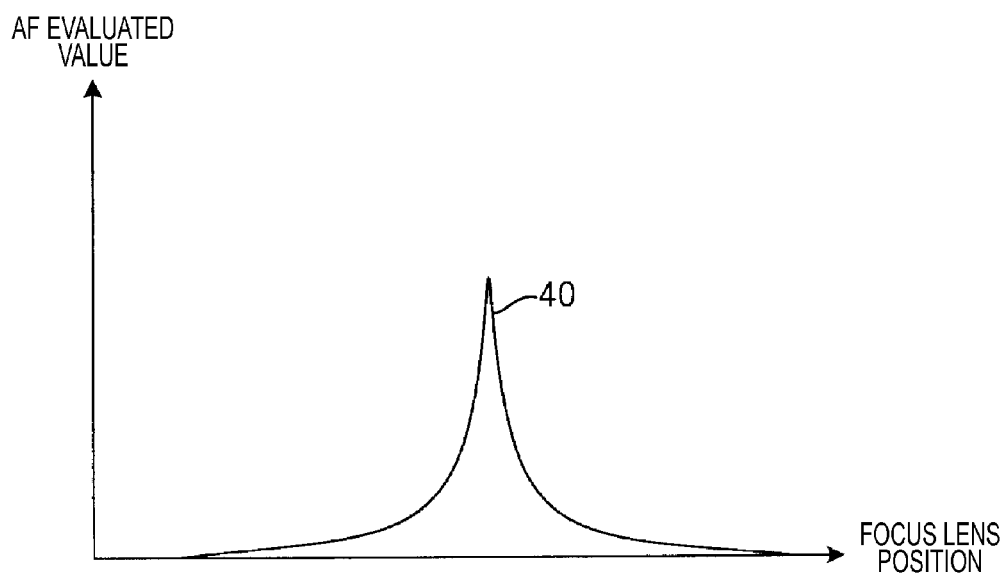
FIG. 4 is a view illustrating one example of an AF evaluated value curve.

FIGS. 3 and 4 are views illustrating examples of evaluated value curves. When an object in a desired focusing region (AF region) is dominant in low frequency component, the evaluated value curve becomes an evaluated value curve 30 having a low sharpness in the vicinity of the maximal point, as illustrated in FIG. 3. Meanwhile, when the object in the AF region is dominant in high frequency component the evaluated value curve becomes an evaluated value curve 40 having a high sharpness in the vicinity of the maximal point, as illustrated in FIG. 4.

As described above, the evaluated value curve has a sharpness varied in the vicinity of the maximal point depending on an object. The sharpness calculation unit 192 calculates the sharpness that varies by a difference in object.

Hereinafter, a sharpness calculation method will be described.

FIG. 3 illustrates at least three AF evaluated values $y0$, $y1$ and $y2$ as described above and focus lens position information $x0$, $x1$, and $x2$ corresponding to the respective three AF evaluated values. The AF evaluated value $y1$ is the maximum value among the AF evaluated values calculated by the AF evaluated value calculation unit 191.

The sharpness calculation unit 192 calculates a sharpness S that is an index representing the sharpness in the vicinity of the maximal point of the evaluated value curve.

When the relationship between the three AF evaluated values $y0$, $y1$, and $y2$ and the focus lens positions $x0$, $x1$, and $x2$ corresponding thereto is represented by, for example, a second degree function, an approximate function is assumed as follows;

$$y=c0+c1(x-x0)+c2(x-x0)(x-x1) \quad (1)$$

In Formula (1), "$c2$" is obtained using, for example, a well-known Newtonian interpolation method.

When substituting $x=x0$ and $y=y0$ into Formula (1), the following may be obtained.

$$y0=c0 \quad (2)$$

When substituting $x=x1$ and $y=y1$ into Formula (1), the following may be obtained.

$$y1=c0+c1(x1-x0) \quad (3)$$

When subtracting Formula (2) from Formula 3, $y1-y0=c1(x1-x0)$ and from the formula, $c1=(y1-y0)/(x1-x0)$.

When substituting $x=x2$ and $y=y2$ into Formula (1), the following may be obtained.

$$y2=c0+c1(x2-x0)+c2(x2-x0)(x2-x1) \quad (4)$$

When subtracting Formula (3) from Formula (4), $y2-y1=c1(x2-x1)+c2(x2-x0)(x2-x1)=\{c1+c2(x2-x0)\}(x2-x1)$ is obtained which is also expressed as $c2=\{(y2-y1)/(x2-x1)-c1\}/(x2-x0)$.

While "$c2$" has a minus value because the parabola of AF evaluated values is upwardly convex, the sharpness is determined based on an absolute value of $c2$ in order to simplify the description.

In a case where the absolute value of $C2$ is large, the approximate function of AF evaluated values becomes a steep parabola because the parabola is more greatly varied in y with respect to the variation in x.

Because sampling points of AF evaluated values are only three points, the value of $c2$ calculated by the method as described above may be significantly different from the original sharpness. This is because the sampling points deviate from an approximate second degree curve.

For example, in a case where the maximum AF evaluated value among the three points is $y1$ and $y1$ greatly deviates from an original value by a certain influence, $c2$ may deviate from the original curve to the direction in which the sharpness is large in the form of being drawn to $y1$. Likewise, in a case where the two points $x0$ and $x2$ among the sampling points of AF evaluated values except for the maximum value greatly deviate in the x-axis direction, the absolute value of $c2$ decreases in appearance.

In order to correct this, the inventor has found that $\{|x1-x0| \times |x1-x2|\}/y1$ may be used as a coefficient of normalization, a value obtained by multiplying the coefficient by c2 may be evaluated as the sharpness S.

Here, AF evaluated values are taken at the three points x0, x1, and x2 (x0<x1<x2), and the AF evaluated values are taken such that the AF evaluated value y1 at x1 becomes the maximum among y0, y1, and y2.

That is, the sharpness is evaluated as follows.

$$S=\{|c2| \times |x1-x0| \times |x1-x2|\}/y1 \quad (5)$$

When this index is used, the sharpness may be more accurately determined because the spreading state of the parabola may be determined based on only one variable even if the magnitudes of the AF evaluated values or the intervals between the sampling points are different from each other.

Alternatively, instead of the sharpness S, the sharpness calculation unit 192 calculates a distortion degree, skew, to be described below, which represents asymmetricity of opposite sides near an average value of data distribution, as an index representing the sharpness in the vicinity of the maximal point of the evaluated value curve.

In a case of calculating the distortion degree, skew, by using at least two AF evaluated values in addition to the three AF evaluated values as described above, the x coordinate of the focus lens position corresponding to the maximum AF evaluated value is treated as zero. In this way, the distortion degree, skew, may be obtained by the following Formula 6.

[Equation 1]

$$\text{skew} = \frac{n}{(n-1)(n-2)} \sum_{i=1}^{n} \left(\frac{x_i - \mu}{\delta}\right)^3 \quad (6)$$

In Formula (6), "n" is the number of AF evaluated values used in calculation and has a minimum value of 5. Xi of Formula (6) is a value representing the position of the focus lens, and, among X1 to Xn, Xi is zero when the AF evaluated value becomes the maximum. In addition, "$\mu$" of Formula (6) is an average value of n AF evaluated values, and "$\delta$" is a standard deviation of n AF evaluated values.

Among plural kinds of calculation methods using the three AF evaluated values y0, y1, and y2 as described above and the focus lens position information x0, x1 and x2 corresponding to the respective three AF evaluated values, the focusing position calculation unit 193 selects one method based on the sharpness calculated by the sharpness calculation unit 192 and calculates, as a focusing position, a focus lens position corresponding to the maximal point of the evaluated value curve using the selected calculation method.

The plural kinds of calculation methods include a first calculation method and a second calculation method.

The first calculation method is a method for calculating a second degree function that represents an evaluated value curve passing through three points (x0, x1), (x1, y1), and (x2, y2) and calculating a focusing position using the calculated second degree function.

When the focusing position is calculated using the first calculation method, the focusing position calculation unit 193 assumes that an expected evaluated value curve is a left-right symmetrical parabola $y=\alpha x^2+\beta x+\gamma$. In addition, the focusing position calculation unit 193 sets up simultaneous equations of a parabola passing through three points (x0, y0), (x1, y1), and (x2, y2) and solves the equations, thereby obtaining coefficients $\alpha$, $\beta$, and $\gamma$ of the second degree function showing the parabola. Then, the obtained second degree function is differentiated to calculate an inflection point of the parabola (corresponding to the maximal point of the evaluated value curve) and hence to calculate a focusing position.

The second calculation method is a method for calculating a linear function passing through two points among the points (x0, y0), (x1, y1), and (x2, y2) and a linear function passing through the other point, both the linear functions having plus and minus signs of the gradients thereof, and calculating a focusing position using the two calculated linear functions.

When calculating the focusing position using the second calculation method, the focusing position calculation unit 193 first calculates a linear function representing a straight line (reference numeral 31 in FIG. 3) passing through (x0, y0) and (x1, y1) and a linear function representing a straight line (reference numeral 32 in FIG. 3) passing through (x1, y1) and (x2, y2).

Then, by comparing the magnitudes of gradients (absolute values except a sign) of the two linear functions, the focusing position calculation unit 193 calculates a linear function, which has the plus/minus sign of the gradient opposite to that of the linear function having the greater gradient (the linear function represented by the straight line 31 in the example of FIG. 3) and represents a straight line (reference numeral 33 in FIG. 3) passing through the other point (x2, y2) other than the two points through which the straight line having the greater gradient passes.

Finally, the focusing position calculation unit 193 calculates, as a focusing position, the x coordinate (xg in FIG. 3) at the intersection of the straight line 31 and the straight line 33 using the liner functions representing the straight line 31 and the straight line 33.

The first calculation method is advantageous in increasing the AF speed because the AF precision may be maintained even if the sampling number of AF evaluated values decreases. However, when a real evaluated value curve has an increased sharpness in the vicinity of the maximal point as illustrated in FIG. 4, an error in the calculated focusing position increases.

Meanwhile, in a case where the evaluated value curve was as illustrated in FIG. 4, the second calculation method may reduce an error in the calculated focusing position as compared to the case in which the first calculation method is used.

Figure 5:
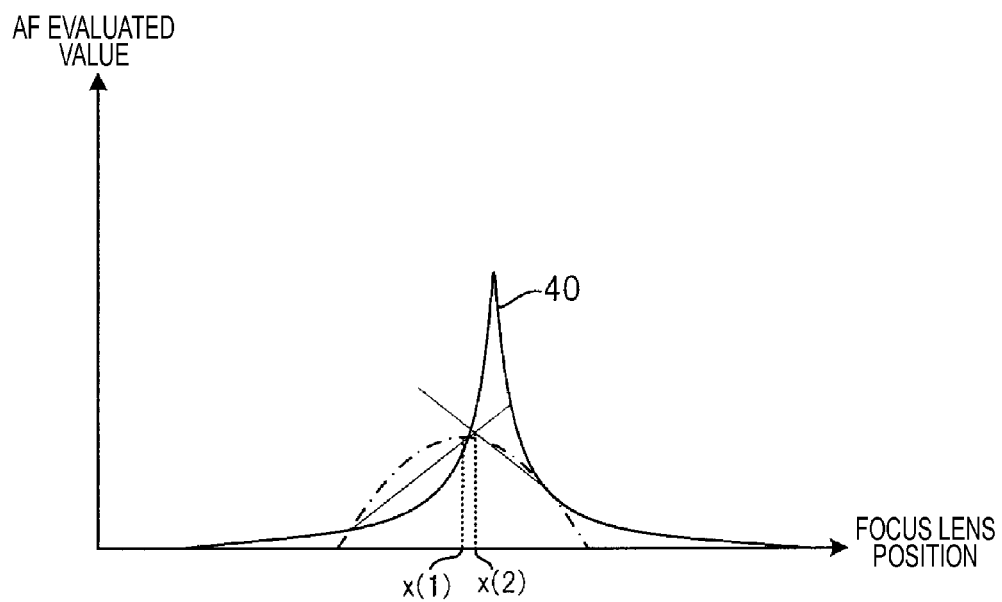
FIG. 5 is a view for explaining calculation errors of a focusing position by a first calculation method and a second calculation method in a case where the AF evaluated value curve is as illustrated in FIG. 4.

FIG. 5 is a view illustrating a focusing position x(1) calculated by the first calculation method and a focusing position x(2) calculated by the second calculation method in a case where the evaluated curve is the evaluated value curve illustrated in FIG. 4. As illustrated in FIG. 5, in a case where the evaluated value curve has a high sharpness, the focusing position obtained by the second calculation method comes closer to an accurate value. The result illustrated in FIG. 5 is given by way of example and the calculated results of the focusing positions by the first calculation method and the second calculation method may increase. In addition, the second calculation method may be used because focus deviation has an effect on image quality even at a difference as illustrated in FIG. 5.

Accordingly, the focusing position calculation unit 193 calculates a focusing position by the first calculation method in a case where the sharpness calculated by the sharpness calculation unit 192 is equal to or less than a predetermined critical value TH1, and calculates a focusing position by the second calculation method having a smaller error in a case where the sharpness calculated by the sharpness calculation unit 192 exceeds the predetermined critical value TH1. That is, the focusing position calculation unit 193 selects a calculation method having a smaller error according to the sharpness and calculates a focusing position by the selected method, thereby preventing deterioration in AF precision.

Next, an AF operation of the digital camera illustrated in FIG. 1 will be described.

Figure 6:
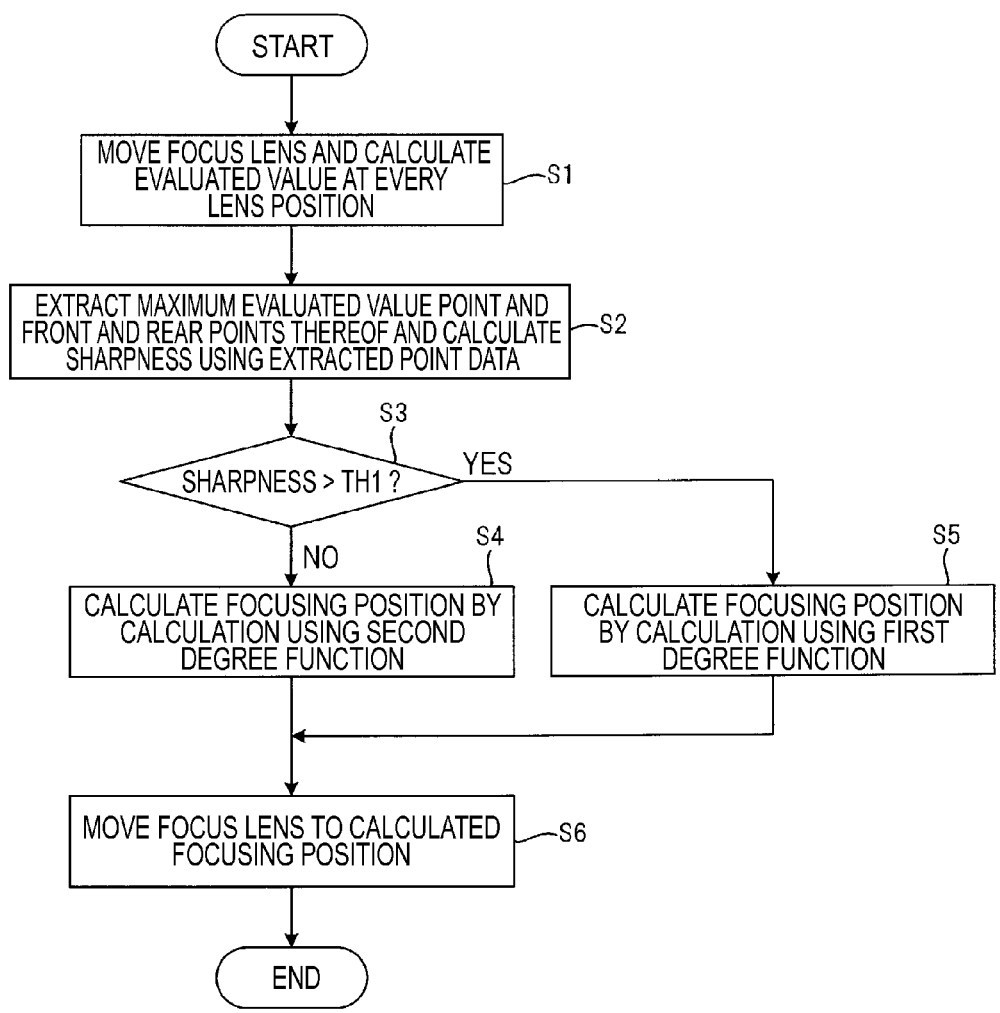
FIG. 6 is a flowchart for explaining an AF operation of the digital camera illustrated in FIG. 1.

FIG. 6 is a flowchart for explaining an AF operation of the digital camera illustrated in FIG. 1. The flowchart illustrated in FIG. 6 begins as a shutter button is half-pushed or an instruction to perform AF is input to the system control unit 11.

When there is an instruction to perform AF, the system control unit 11 moves the focus lens from a MOD stage to an INF stage. While the focus lens is moving, imaging is performed by the solid imaging element 5 at every prescribed time and picked-up image signals obtained by the imaging are transmitted to the contrast AF processing unit 19.

The contrast AF processing unit 19 calculates AF evaluated values from the obtained picked-up image signals whenever the picked-up image signals are obtained, and stores, in the main memory 16, position information of the focus lens when the picked-up image signals are obtainable such that the position information corresponds to the calculated AF evaluated values (step S1).

The sharpness calculation unit 192 obtains, from the main memory 16, peak point data that includes the maximum AF evaluated value and the focus lens position information corresponding thereto, pre-peak point data that includes position information in front of the focus lens position (the MOD stage side or the INF stage side) and an AF evaluated value corresponding thereto, and post-peak point data that includes position information behind the focus lens position (at the INF stage side or the MOD stage side) and an AF evaluated value corresponding thereto by monitoring the AF evaluated values stored in the main memory 16. Then, the sharpness calculation unit 192 calculates the sharpness in the vicinity of the maximal point of the evaluated value curve using the obtained pre-peak point data, peak point data, and post-peak point data (step S2).

The focusing position calculation unit 193 compares the sharpness calculated in step S2 with a critical value TH1 (step S3). When the sharpness is equal to or less than the critical value TH1 (step S3: NO), the focusing position calculation unit 193 calculates a focusing position by the first calculation method using the pre-peak point data, the peak point data, and the post-peak point data (step S4).

Meanwhile, when the sharpness exceeds the critical value TH1 (step S3: YES), the focusing position calculation unit 193 calculates a focusing position by the second calculation method using the pre-peak point data, the peak point data, and the post-peak point data (step S5).

When the focusing position is calculated in steps S4 and S5, the system control unit 11 controls the movement of the focus lens to the focusing position based on the calculated focusing position information (step S6), and terminates the auto-focus processing.

As described above, according to the digital camera of FIG. 1, the sharpness in the vicinity of the maximal point of an evaluated value curve that obtained by calculating AF evaluated values at each of a plurality of focus lens positions is estimated by at least three point data and a focusing position is calculated based on the sharpness using a calculation method having a smaller error. Thus, the AF precision may be improved as compared to a conventional method for calculating a focusing position using only a first calculation method or a second calculation method.

In addition, according to the digital camera of FIG. 1, the sharpness may be calculated when there are at least three point data and the AF precision may be improved by switching between the calculation methods based on the sharpness. Therefore, it is unnecessary to improve the AF precision by reducing the movement speed of the focus lens to increase the sampling number of AF evaluated values. Accordingly, the increased AF speed and the improved AF precision may be accomplished.

Meanwhile, in the above description, a curve function used in the first calculation method is a second degree function showing a right-right symmetrical parabola. However, in a case where so-called panning is performed in which photographing is performed by focusing on an object while following the moving object, the evaluated value curve may not be left-right symmetrical by the movement speed of the object.

Thus, in a case where the first calculation method is selected, a focusing position may be calculated using a second function as well as a higher degree function (e.g., a spline curve function or a Bezier curve function) as a curve function.

When using a third or higher degree function, the function is calculated by obtaining point data of the number according to the degree from the main memory 16. In addition, in a case of selecting the first calculation method, which function will be used may be determined based on the speed of a moving object which is detected by an image processing, or the movement speed of the digital camera detected using a movement detector such as a gyroscope sensor.

In addition, in a case where the first calculation method is selected, when using a second degree function as a curve function, a focusing position may be calculated to reduce a calculation error of the focusing position after a processing of displacing the phase of a parabola passing through a pre-peak point, a peak point, and a post-peak point is performed using separate point data other than the pre-peak point data, the peak point data, and the post-peak point data.

Hereinafter, a variation of the AF operation of the digital camera illustrated in FIG. 1 will be described.

Figure 7:
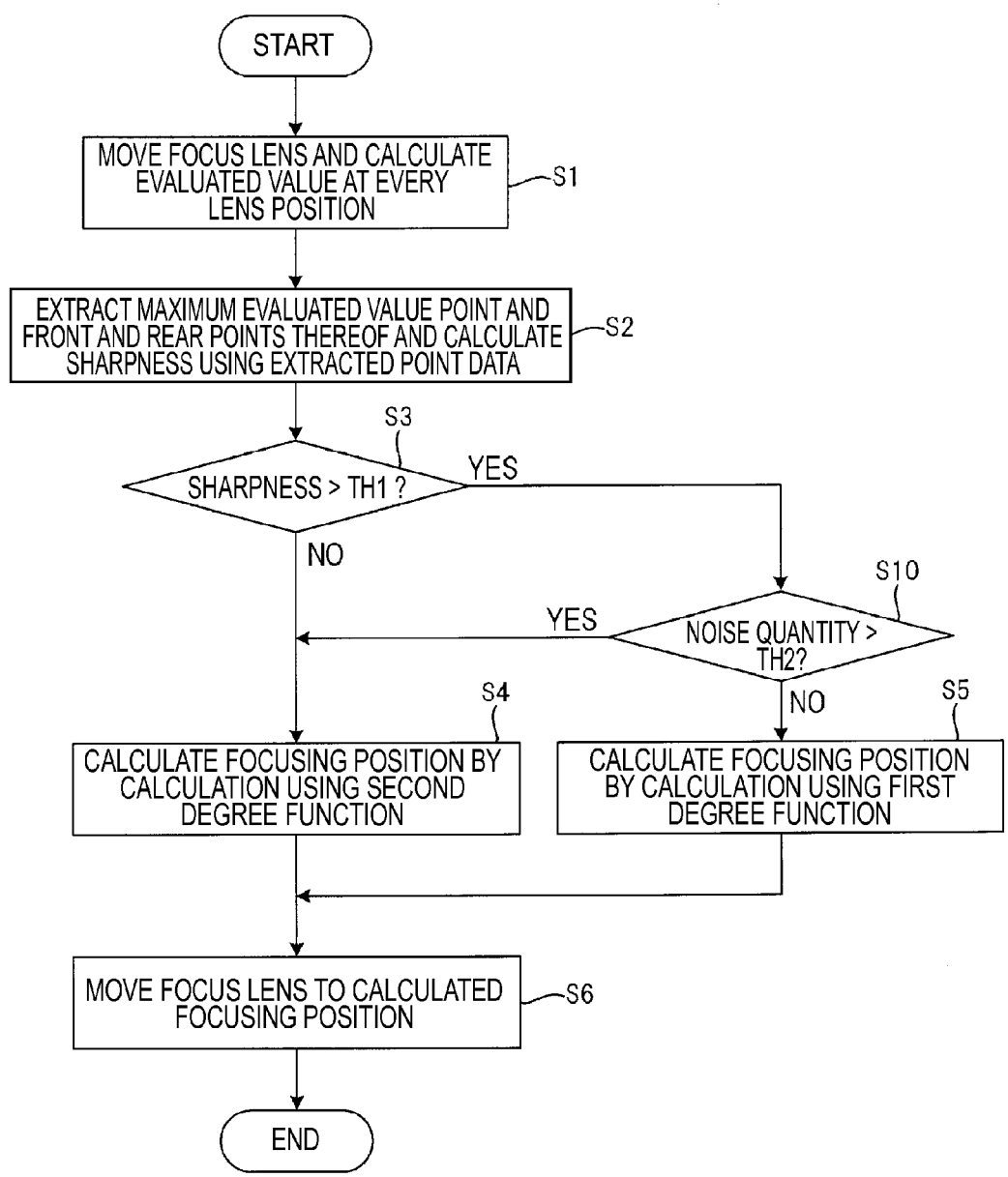
FIG. 7 is a flowchart for explaining one variation of the AF operation of the digital camera illustrated in FIG. 1.

FIG. 7 is a flowchart for explaining one variation of the AF operation of the digital camera illustrated in FIG. 1. The flowchart illustrated in FIG. 7 is identical to the flowchart illustrated in FIG. 6 except that step S10. The processings of FIG. 7, which are the same as the processings illustrated in FIG. 6, will be designated by the same reference numerals and descriptions thereof will be omitted.

The sharpness calculation unit 192 estimates the sharpness from at least three point data. Therefore, in a case where much noise enters in AF evaluated values included in the point data, the reliability of the calculated sharpness is deteriorated. In addition, when much noise is included in the AF evaluated values, the second calculation method has a greater error than the first calculation method.

For example, in a case where the photographing environment is a dark place, the influence of noise increases. Examples of noise quantity measurement methods include a method in which variation in the brightness of a live view image is handled as the noise quantity, a method in which variation in AF evaluated value obtained from a live view image is handled as the noise quantity, and a method in which results of AF evaluated values (difference in the forms of the evaluated values) are compared and determined through a plurality of filters having different bands.

As such, in this variation, when the determination of step S3 is YES, the focusing position calculation unit 193 determines the noise quantity included in the AF evaluated values calculated in step S1 (step S10). When the noise quantity exceeds a critical value TH2, the focusing position calculation unit 193 performs the processing of step S4, and when the noise quantity is equal to or less than the critical value TH2, the focusing position calculation unit 193 performs the processing of step S5.

The noise quantity included in the AF evaluated values increases in a situation in which the brightness of an object is low and an analog gain of a picked up image signal increases (upon setting of high ISO sensitivity). In addition, the noise quantity included in the AF evaluated values increases even in a situation where hand shaking occurs.

The focusing position calculation unit 193 determines whether or not the noise quantity included in the AF evaluated values exceeds the critical value TH2 by the brightness of the object, the magnitude of ISO sensitivity, or existence or non-existence of occurrence of hand shaking. When the noise quantity exceeds the critical value TH2, the focusing position calculation unit 193 determines that the reliability of the sharpness calculated by the sharpness calculation unit 192 is low. Thus, even if the sampling number is small, the focusing position calculation unit 193 may calculate the focusing position with a high precision even if the sampling number is low, and even if the noise is much, the focusing position calculation unit 193 calculates the focusing position by the first calculation method having a smaller error.

In this way, even though the real evaluated value curve is as illustrated in FIG. 3, the second calculation method having a greater error is employed, which may prevent degradation of the AF precision.

Figure 8:
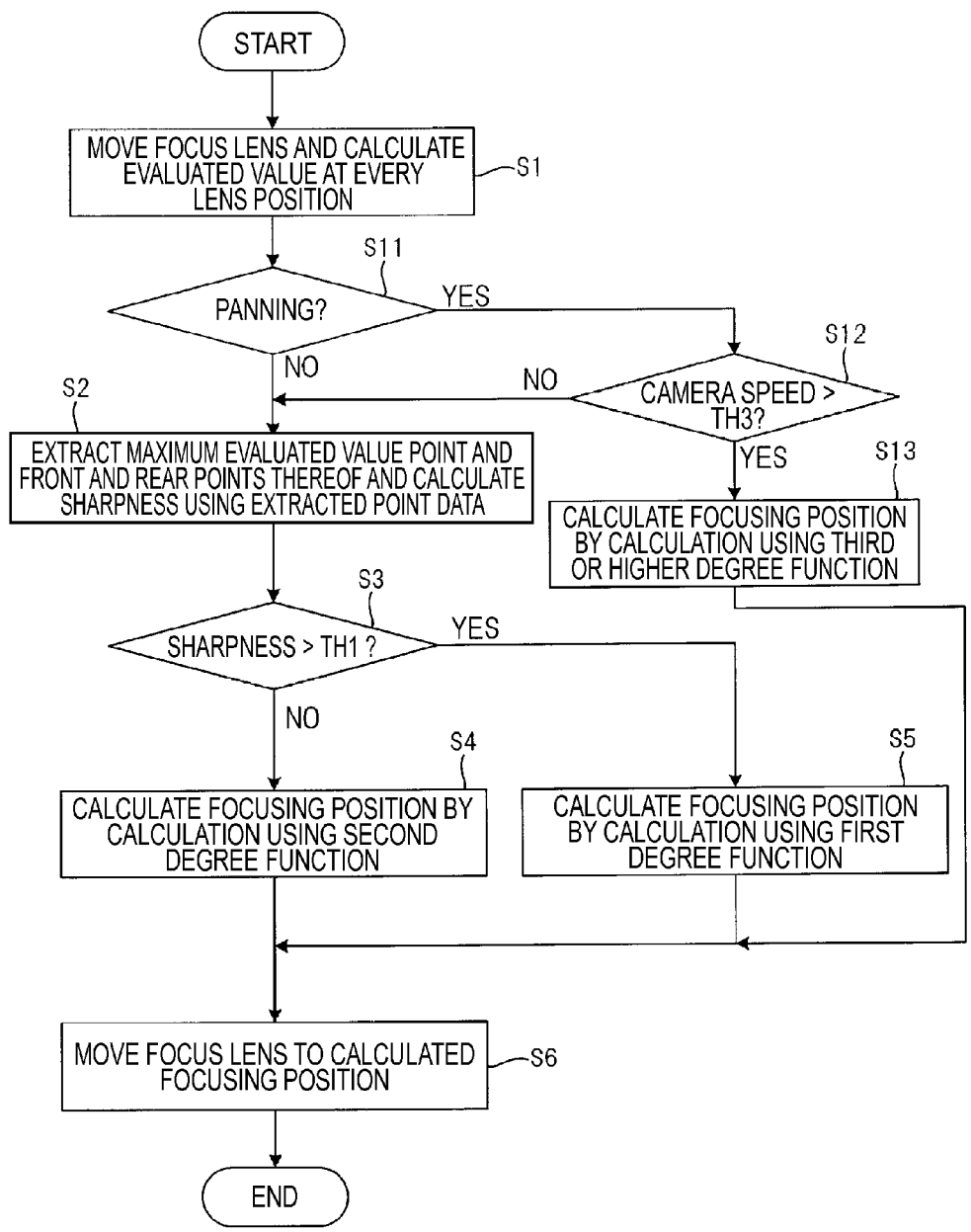
FIG. 8 is a flowchart for explaining another variation of the AF operation of the digital camera illustrated in FIG. 1.

FIG. 8 is a flowchart for explaining another variation of the AF operation of the digital camera illustrated in FIG. 1. The flowchart illustrated in FIG. 8 is identical to the flowchart illustrated in FIG. 6 except that steps S11, S12 and S13 are added. In FIG. 8, the processings which are the same as those illustrated in FIG. 6 will be designated by the same reference numerals and descriptions thereof will be omitted.

In a case where panning is being performed, when the movement speed of an object (the same meaning as the movement speed of the camera following the object) is great, the evaluated value curve does not have a left-right symmetrical shape. As such, in a photographing situation where the evaluated value curve has a left-right asymmetrical shape, the error in the case where the focusing position is calculated using a third or higher degree function such as a spline curve function or a Bezier curve function is smaller than the error in the case where the focusing position is calculated using a second degree function or a first degree function.

For this reason, after step S1, the system control unit 11 determines whether or not panning is being performed (step S11).

The system control unit 11 determines whether or not panning is performed by detecting movement of the camera using detection information from a movement detector such as a gyroscope sensor installed to the digital camera, detecting that the object that is being photographed includes a moving object by analyzing a live view image, or via a combination thereof.

When panning is not performed, the processings after step S2 are performed.

Meanwhile, when panning was performed, the system control unit 11 compares the movement speed of the camera detected by the movement detector or the movement speed of the moving object detected by analysis of the live view image with a predetermined critical value TH3 (step S12).

When the movement speed of the camera or the movement speed of the moving object is equal to or less than the critical value TH3, the processings after step S2 are performed. When the movement speed of the camera or the movement speed of the moving object exceeds the critical value TH3, the processing of step S13 is performed.

In step S13, the focusing position calculation unit 193 calculates a third or higher degree function such as a spline curve function or a Bezier curve function from the evaluated values calculated in step S1 and the focus lens position information corresponding thereto and then calculates a focusing position using the calculated function. The processing of step S6 is performed after step S13.

As described above, according to the digital camera of the present variation, in a situation where the panning is being performed and the movement speed of the camera or the moving object is high, i.e. in a situation where the evaluated value curve is left-right asymmetrical, the AF processing may be efficiently performed with a high precision because the focusing position is calculated using a high degree curve function of third or higher degree without calculating the sharpness.

Meanwhile, in FIG. 8, after step S2, step S10 may be added in the same manner as in FIG. 7.

Heretofore, descriptions have been made assuming that the solid imaging element 5 is not equipped with an optical loss-pass filter. Because the solid imaging element not equipped with an optical loss-pass filter has an increased resolution as compared to a solid imaging element equipped with an optical loss-pass filter, high frequency components in a photographed image increase. For this reason, the solid imaging element not equipped with an optical loss-pass filter strongly tends to attain an evaluated value curve having a high sharpness as illustrated in FIG. 4. Thus, employing the AF control described in the present exemplary embodiment is particularly effective.

Even with a solid imaging element equipped with an optical loss-pass filter, the evaluated value curve may have a high sharpness in some objects as illustrated in FIG. 4. Therefore, even in a case where a solid imaging element equipped with an optical loss-pass filter is used as the solid imaging element 5, employing the AF control described in the present exemplary embodiment is effective.

Subsequently, descriptions will be made on a configuration of a smart phone serving as an imaging apparatus.

Figure 9:
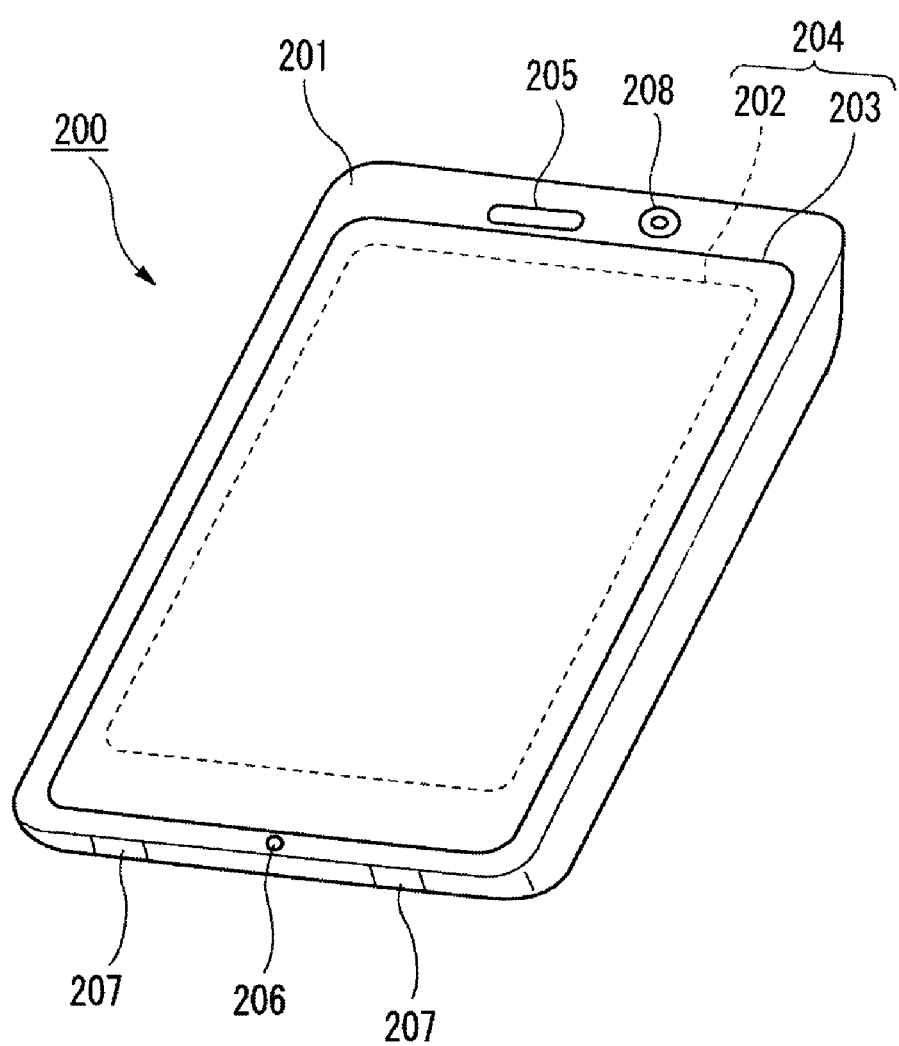
FIG. 9 is a view explaining a smart phone serving as an imaging apparatus.

FIG. 9 illustrates an external appearance of a smart phone 200 as an exemplary embodiment of the imaging apparatus of the present invention. The smart phone 200 illustrated in FIG. 9 includes a housing 201 having a flat plate shape, and is provided with a display panel 202 serving as a display unit one surface of the housing 201, and a display input unit 204 having an operating panel 203 serving as an input unit which is integrally formed therewith. In addition, the housing 201 includes a speaker 205, a microphone 206, an operating unit 207, and a camera unit 208. Meanwhile, the configuration of the housing 201 is not limited thereto, and may employ, for example, a configuration in which a display unit and an input unit are independent from each other, or a configuration having a folder structure or a slide mechanism.

Figure 10:
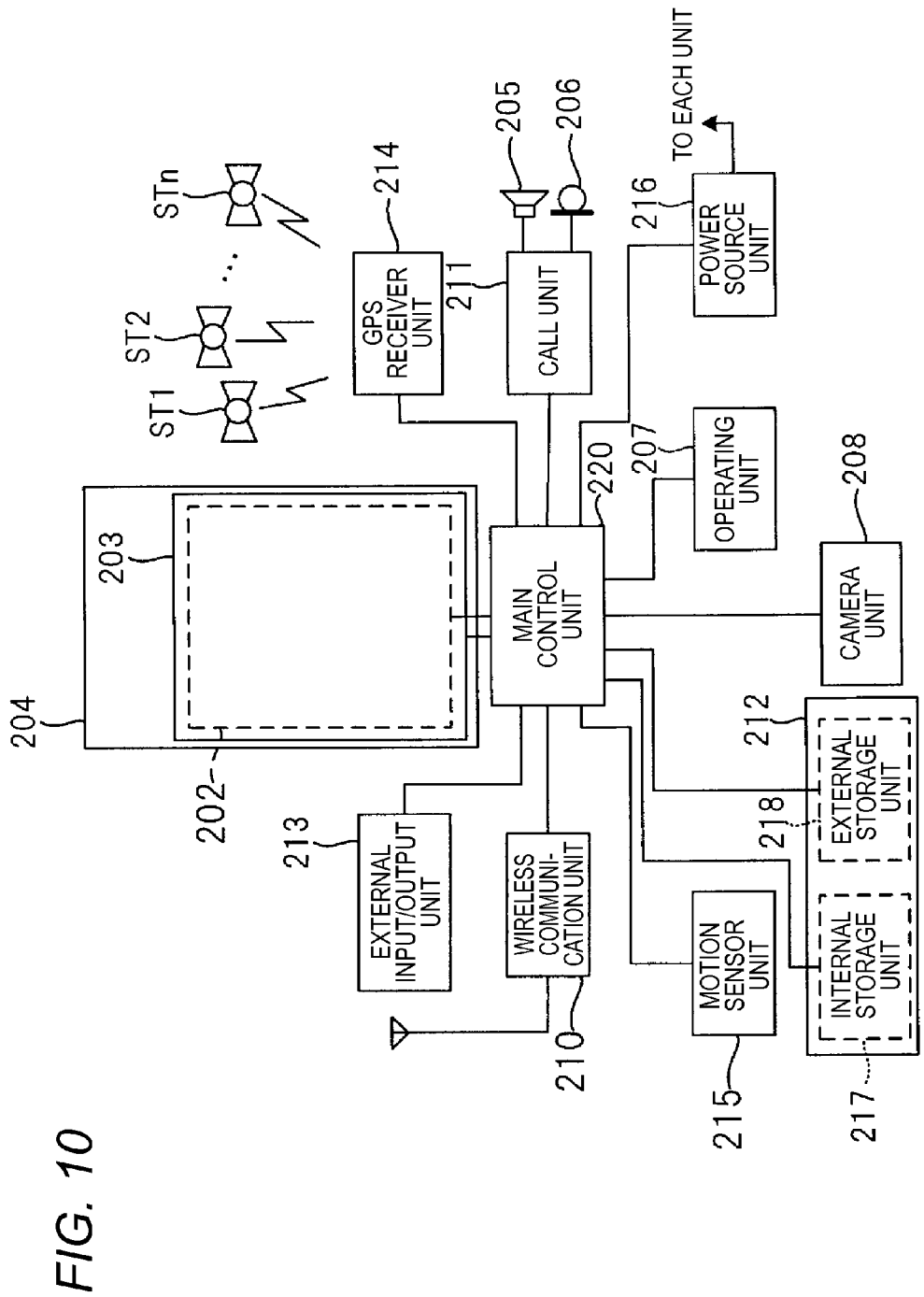
FIG. 10 is an internal block diagram of the smart phone of FIG. 9.

FIG. 10 is a block diagram illustrating a configuration of the smart phone 200 illustrated in FIG. 9. As illustrated in FIG. 9, the smart phone 200 includes, as major components, a wireless communication unit 210, a display input unit 204, a call unit 211, an operating unit 207, a camera unit 208, a storage unit 212, an external input/output unit 213, a GPS (Global Positioning System) receiver unit 214, a motion sensor unit 215, a power source unit 216, and a main control unit 220. In addition, the smart phone 200 is provided with, as a major function, a wireless communication function for mobile wireless communication with a base station BS (not illustrated) through a mobile communication network (NW) (not illustrated).

The wireless communication unit 210 performs wireless communication with the base station BS accommodated in the mobile communication network NW according to an instruction of the main control unit 220. The wireless communication unit 210 performs transmission/reception of, for example, various file data such as voice data and image data, and electronic mail data, or reception of, for example, web data or streaming data using the wireless communication.

The display input unit 204 is a so-called touch panel that displays, for example, images (still images and moving images) or text information so as to visually transmit the information to a user under the control of the main control unit 220 and to detect the user's operation with respect to the displayed information, and is provided with a display panel 202 and an operating panel 203.

The display panel 202 uses, for example, an LCD (Liquid Crystal Display) or an OLED (Organic Electro-Luminescence Display) serving as a display device.

The operating panel 203 is a device that is disposed on a display surface of the display panel 202 so as to enable visual recognition of an image displayed on the display surface and to detect one or more coordinates operated by the user's fingers or a stylus. When the device is operated by the user's fingers or the stylus, the operating panel 203 outputs a detection signal generated due to the operation to the main control unit 220. Subsequently, the main control unit 220 detects an operating position (coordinates) on the display panel 202 based on the received detection signal.

As illustrated in FIG. 9, the display panel 202 and the operating panel 203 of the smart phone 200 exemplified as one exemplary embodiment of an imaging apparatus of the present invention are integrally formed to constitute the display input unit 204. The operating panel 203 is arranged to completely cover the display panel 202.

When this arrangement is employed, the operating panel 203 may have a function of detecting the user's operation even with respect to a region outside the display panel 202. In other words, the operating panel 203 may have a detection region (hereinafter, referred to as a display region) related to an overlapping portion that is superposed on the display panel 202, and the remaining detection region (hereinafter, referred to as a non-display region) related to an outer edge portion that is not superposed on the display panel 202.

Meanwhile, the size of the display region and the size of the display panel 202 may be completely matched to each other, but it is not always necessary to match both sizes with each other. In addition, the operating panel 203 may have two sensitive regions of an outer edge portion and an inner portion other than the outer edge portion. In addition, the width of the outer edge portion is appropriately designed according to, for example, the size of the housing 201. In addition, a position detection method employed in the operating panel 203 may be, for example, a matrix switch method, a resistance film method, a surface elastic wave method, an infrared method, an electronic induction method, and a capacitance method, and any method may be employed.

The call unit 211 includes the speaker 205 or the microphone 206 so as to convert the user's voice input through the microphone 206 into voice data processable by the main control unit 220 and output the voice data to the main control unit 220, or to decode voice data received by the wireless communication unit 210 or the external input/output unit 213 and output the decoded voice data from the speaker 205. In addition, as illustrated in FIG. 9, for example, the speaker 205 may be mounted on the same surface as the installation surface of the display input unit 204, and the microphone 206 may be mounted to a side surface of the housing 201.

The operating unit 207 is a hardware key using, for example, a key switch and receives an instruction from the user. For example, as illustrated in FIG. 9, the operating unit 207 is mounted on the side surface of the housing 201 of the smart phone 200. The operating unit 207 is a push button type switch that is turned on when pushed by, for example, a finger and turned off by restoration of, for example, a spring when the finger is removed.

The storage unit 212 stores control programs or control data of the main control unit 220, application software, address data corresponding to, for example, the name or phone number of a communication partner, data of transmitted/received e-mails, and web data downloaded by web browsing or downloaded content data, and temporarily stores, for example, streaming data. In addition, the storage unit 212 is configured by an internal storage unit 217 embedded in the smart phone and an external storage unit 218 having a freely separable external memory slot. Meanwhile, each of the internal storage unit 217 and the external storage unit 218 constituting the storage unit 212 is implemented using a storage medium such as a flash memory type memory, a hard disk type memory, a multimedia card micro type memory, a card type memory (e.g., a MicroSD (registered trademark) memory), a RAM (Random Access Memory), or a ROM (Read Only Memory.

The external input/output unit 213 serves as an interface with all external appliances connected to the smart phone 200 and is intended to be directly or indirectly connected to other external appliances via communication (e.g., universal serial bus or IEEE1394) or network (e.g., Internet, wireless LAN, Bluetooth (registered trademark), RFID (Radio Frequency IDentification), infrared data association (IrDA) (registered trademark), ultra wide band (UWB) (registered mark), and ZigBee (registered trademark)).

Examples of external appliances connected to the smart phone 200 include a wired/wireless headset, a wired/wireless external charger, a wired/wireless data port, a memory card connected via a card socket, a SIM (Subscriber Identity Module) card/UIM (User Identity Module) card, an external audio/video appliance connected via an audio/video I/O (Input/Output) terminal, a wirelessly connected external audio/video appliance, a wiredly/wirelessly connected smart phone, a wiredly/wirelessly connected personal computer, a wiredly/wirelessly connected PDA, a wiredly/wirelessly connected personal computer, and an earphone. The external input/output unit 213 may transmit data transmitted from such an external appliance to respective components within the smart phone 200, or transmit internal data of the smart phone 200 to the external appliance.

The GPS receiver unit 214 receives GPS signals transmitted from GPS satellites ST1 to STn according to an instruction of the main control unit 220 and executes a positioning calculation processing based on the received GPS signals, thereby detecting a location including the latitude, the longitude, and the elevation of the smart phone 200. When the GPS receiver unit 214 is capable of acquiring position information from the wireless communication unit 210 or the external input/output unit 213 (e.g., wireless LAN), the GPS receiver unit 214 may detect a location using the position information therefrom.

The motion sensor unit 215 includes, for example, a 3-axis acceleration sensor so as to detect a physical movement of the smart phone 200 according to an instruction of the main control unit 220. The movement direction or acceleration of the smart phone 200 is detected by detecting a physical movement of the smart phone 200. The detected result is output to the main control unit 220.

The power source unit 216 supplies a power accumulated in a battery (not illustrated) to each part of the smart phone 200 according to an instruction of the main control unit 220.

The main control unit 220 includes a microprocessor so as to operate according to control programs or control data stored in the storage unit 212 to totally control each part of the smart phone 200. In addition, the main control unit 220 has a mobile communication control function and an application processing function to control each part of a communication system via the wireless communication unit 210 in order to perform voice communication or data communication.

The application processing function is implemented as the main control unit 220 operates according to application software stored in the storage unit 212. Examples of application processing function include an infrared communication function for data communication with a counterpart appliance by controlling the external input/output unit 213, an electronic mail function for transmission/reception of e-mails, and a web browsing function for reading a web page.

In addition, the main control unit 220 has, for example, an image processing function of displaying an image on the display input unit 204 based on image data (still image or moving image data) such as received data or downloaded streaming data. The image processing function refers to a function performed by the main control unit 220 to decode the image data, to perform an image processing based on the decoded result, and to display the image on the display input unit 204.

In addition, the main control unit 220 executes a display control for the display panel 202 and operating a detection control for detecting the user's operation performed via the operating unit 207 and the operating panel 203. With the execution of the display control, the main control unit 220 displays a software key such as an icon or a scroll bar for starting application software, or a window for writing an e-mail. Meanwhile, the scroll bar refers to a software key for receiving an instruction to move a display portion of a large image that does not wholly enter the display region of the display panel 202.

In addition, through the execution of the operating detection control, the main control unit 220 detects the user's operation performed via the operating unit 207, or receives an operation performed on an icon via the operating panel 203 or an input of a character string on an input box of the window, or receives a scroll demand for a display image via the scroll bar.

In addition, through the execution of the operating detection control, the main control unit 220 has a touch panel control function of determining whether an operating position for the operating panel 203 is an overlapping portion (display region) superposed on the display panel 202 or any other non-overlapping outer edge portion (non-display region) not superposed on the display panel 202, and controlling a display position of a sensitive region of the operating panel 203 or a software key.

In addition, the main control unit 220 may detect a gesture operation with respect to the operating panel 203 and execute a preset function according to the detected gesture operation. The gesture operation means an operation of drawing a path with, for example, a finger, an operation of simultaneously designating a plurality of positions, or an operation of combining the operations so as to draw a path for at least one of the positions, rather than a conventional simple touch operation.

The camera unit 208 includes components, other than the external memory control unit 20, the recording medium 21, the display control unit 22, the display unit 23, and the operating unit 14 of the digital camera illustrated in FIG. 1. Picked-up image data produced by the camera unit 208 may be stored in the storage unit 212, or may be output via the input/output unit 213 or the wireless communication unit 210. As illustrated in FIG. 8, in the smart phone 200, while the camera unit 208 is mounted to the same surface as the display input unit 204, the mounting position of the camera unit 208 is not limited thereto and may be mounted on the rear surface of the display input unit 204.

The camera unit 208 may be used in various functions of the smart phone 200. For example, an image obtained by the camera unit 208 may be displayed on the display panel 202, or an image of the camera unit 208 may be used as one operating input of the operating panel 203. In addition, when the GPS receiver unit 214 detects a position, the position may be detected with reference to an image from the camera unit 208. In addition, with reference to an image from the camera unit 208, the optical axis direction of the camera unit 208 of the smart phone 200 may be determined or the current use environment may be determined with or without using a 3-axis acceleration sensor. Of course, an image from the camera unit 208 may be used in application software.

In addition, for example, position information obtained by the GPS receiver unit 214, voice information obtained by the microphone 206 (which may be turned into text information through a voice to text conversion by, for example, the main control unit), and posture information acquired by the motion sensor unit 215 may be added to image data including still images or moving images and then stored in the storage unit 212 or output via the input/output unit 213 or the wireless communication unit 210.

Even in the smart phone 200 having the above-described configuration, when the contrast AF processing unit 19 of FIG. 1 is installed to the camera unit 208, high speed and high precision AF is enabled.

As described above, the following items are disclosed in the description of the embodiments.

It is disclosed an imaging apparatus including: a focus lens configured to be movable in an optical axis direction; an imaging element configured to image an object via the focus lens; an evaluated value calculation unit configured to calculate an evaluated value for focusing using a picked-up image signal obtained through imaging by the imaging element at every position of the focus lens while moving the focus lens; a sharpness calculation unit configured to calculate a sharpness in a vicinity of a maximal point of an evaluated value curve, which represents relationship between a position of the focus lens and the evaluated value, using at least three evaluated values calculated by the evaluated value calculation unit and position information of the focus lens corresponding to each of the three evaluated values; a focusing position calculation unit configured to select, according to at least the sharpness calculated by the sharpness calculation unit, one of plural kinds of calculation methods using the three evaluated values and the position information of the focus lens corresponding to each of the three evaluated values, and to calculate the position of the focus lens corresponding to the maximal point of the evaluated value curve as a focusing position using the selected calculation method; and a focusing control unit configured to perform a focusing control to move the focus lens to the focusing position, in which the calculation methods include: a first calculation method for calculating a second or higher degree function representing the evaluated value curve using the three evaluated values and the position information of the focus lens corresponding to each of the three evaluated values, and calculating the focusing position using the second or higher degree function; and a second calculation method for calculating a first degree function using the three evaluated values and the position information of the focus lens corresponding to each of the three evaluated values and calculating the focusing position using the first degree function, and in which the three evaluated values include a maximum value among the evaluated values calculated by the evaluated value calculation unit and evaluated values calculated in relation with positions in front and rear of the position of the focus lens corresponding to the maximum value.

The imaging apparatus may have a configuration, in which the focusing position calculation unit selects one of the calculation methods according to the sharpness and a noise quantity included in the evaluated values.

The imaging apparatus may have a configuration, in which, in a case where the sharpness exceeds a first critical value and the noise quantity is equal to or less than a second critical value, the focusing position calculation unit selects the second calculation method, in a case where the sharpness exceeds the first critical value and the noise quantity exceeds the second critical value, the focusing position calculation unit selects the first calculation method, and in a case where the sharpness is equal to or less than the first critical value, the focusing position calculation unit selects the first calculation method.

The imaging apparatus may have a configuration, in which, in a case where the sharpness exceeds a critical value, the focusing position calculation unit selects the second calculation method and in a case where the sharpness is equal to or less than the critical value, the focusing position calculation unit selects the first calculation method.

The imaging apparatus may have a configuration, in which, in a case where panning is being performed and a movement speed of the imaging apparatus or a speed of a moving object included in the photographing object exceeds a critical value, the focusing position calculation unit calculates the focusing position using the three evaluated values, the position information of the focus lens corresponding to each of the three evaluated values, and a third or higher degree function, regardless of the sharpness.

The imaging apparatus may have a configuration, in which the imaging element is not equipped with an optical low-pass filter.

It is disclosed a focusing control method by an imaging apparatus having an imaging element configured to perform imaging of an object via a focus lens that is movable in an optical axis direction, the method including: an evaluated value calculation step of calculating an evaluated value for focusing using a picked-up image signal obtained through imaging by the imaging element at every position of the focus lens while moving the focus lens; a sharpness calculation step of calculating a sharpness in a vicinity of a maximal point of an evaluated value curve, which represents relationship between a position of the focus lens and the evaluated value, using at least three evaluated values calculated by the evaluated value calculation unit and position information of the focus lens corresponding to each of the three evaluated values; a focusing position calculation step of selecting, according to at least the sharpness calculated by the sharpness calculation unit, one of plural kinds of calculation methods using the three evaluated values and the position information of the focus lens corresponding to each of the three evaluated values, and calculating the position of the focus lens corresponding to the maximal point of the evaluated value curve as a focusing position using the selected calculation method; and a focusing control step of performing a focusing control to move the focus lens to the focusing position, in which the calculation methods include: a first calculation method for calculating a second or higher degree function representing the evaluated value curve using the three evaluated values and the position information of the focus lens corresponding to each of the three evaluated values, and calculating the focusing position using the second or higher degree function; and a second calculation method for calculating a first degree function using the three evaluated values and the position information of the focus lens corresponding to each of the three evaluated values and calculating the focusing position using the first degree function, and in which the three evaluated values include a maximum value among the evaluated values calculated by the evaluated value calculation unit and evaluated values calculated in relation with positions in front and rear of the position of the focus lens corresponding to the maximum value.

In particular, the disclosed imaging apparatus and the disclosed focusing control method may be conveniently and effectively applied to a digital camera, for example.

What is claimed is:

1. An imaging apparatus comprising:
    a focus lens configured to be movable in an optical axis direction;
    an imaging element configured to image an object via the focus lens;
    an evaluated value calculation unit configured to calculate an evaluated value for focusing using a picked-up image signal obtained through imaging by the imaging element at every position of the focus lens while moving the focus lens;
    a sharpness calculation unit configured to calculate a sharpness in a vicinity of a maximal point of an evaluated value curve, which represents relationship between a position of the focus lens and the evaluated value, using at least three evaluated values calculated by the evaluated value calculation unit and position information of the focus lens corresponding to each of the at least three evaluated values;
    a focusing position calculation unit configured to select, according to at least the sharpness calculated by the sharpness calculation unit, one of plural kinds of calculation methods using the at least three evaluated values and the position information of the focus lens corresponding to each of the at least three evaluated values, and to calculate the position of the focus lens corresponding to the maximal point of the evaluated value curve as a focusing position using the selected calculation method;

a focusing control unit configured to perform a focusing control to move the focus lens to the focusing position; and at least one processor configured to function as the evaluated value calculation unit, the sharpness calculation unit, the focusing position calculation unit, and the focusing control unit, wherein the plural kind of calculation methods include:

a first calculation method for calculating a second or higher degree function representing the evaluated value curve using the at least three evaluated values and the position information of the focus lens corresponding to each of the at least three evaluated values, and calculating the focusing position using the second or higher degree function; and a second calculation method for calculating a first degree function using the at least three evaluated values and the position information of the focus lens corresponding to each of the at least three evaluated values and calculating the focusing position using the first degree function, and wherein the at least three evaluated values include a maximum value among the evaluated values calculated by the evaluated value calculation unit and evaluated values calculated in relation with positions in front and rear of the position of the focus lens corresponding to the maximum value.

2. The imaging apparatus according to claim 1, wherein the focusing position calculation unit selects one of the plural kind of calculation methods according to the sharpness and a noise quantity included in the evaluated values.

3. The imaging apparatus according to claim 2, wherein, in a case where the sharpness exceeds a first critical value and the noise quantity is equal to or less than a second critical value, the focusing position calculation unit selects the second calculation method, in a case where the sharpness exceeds the first critical value and the noise quantity exceeds the second critical value, the focusing position calculation unit selects the first calculation method, and in a case where the sharpness is equal to or less than the first critical value, the focusing position calculation unit selects the first calculation method.

4. The imaging apparatus according to claim 2, wherein, in a case where the sharpness exceeds a critical value, the focusing position calculation unit selects the second calculation method and in a case where the sharpness is equal to or less than the critical value, the focusing position calculation unit selects the first calculation method.

5. The imaging apparatus according to claim 1, wherein, in a case where panning is being performed and a movement speed of the imaging apparatus or a speed of a moving object included in a photographing object exceeds a critical value, the focusing position calculation unit calculates the focusing position using the at least three evaluated values, the position information of the focus lens corresponding to each of the at least three evaluated values, and a third or higher degree function, regardless of the sharpness.

6. The imaging apparatus according to claim 1, wherein the imaging element is not equipped with an optical low-pass filter.

7. A focusing control method by an imaging apparatus having an imaging element configured to perform imaging of an object via a focus lens that is movable in an optical axis direction, the focusing control method comprising:

an evaluated value calculation step of calculating an evaluated value for focusing using a picked-up image signal obtained through imaging by the imaging element at every position of the focus lens while moving the focus lens;

a sharpness calculation step of calculating a sharpness in a vicinity of a maximal point of an evaluated value curve, which represents relationship between a position of the focus lens and the evaluated value, using at least three evaluated values calculated by the evaluated value calculation step and position information of the focus lens corresponding to each of the at least three evaluated values;

a focusing position calculation step of selecting, according to at least the sharpness calculated by the sharpness calculation unit, one of plural kinds of calculation methods using the at least three evaluated values and the position information of the focus lens corresponding to each of the at least three evaluated values, and calculating the position of the focus lens corresponding to the maximal point of the evaluated value curve as a focusing position using the selected calculation method; and a focusing control step of performing a focusing control to move the focus lens to the focusing position, wherein the plural kind of calculation methods include:

a first calculation method for calculating a second or higher degree function representing the evaluated value curve using the at least three evaluated values and the position information of the focus lens corresponding to each of the at least three evaluated values, and calculating the focusing position using the second or higher degree function; and a second calculation method for calculating a first degree function using the at least three evaluated values and the position information of the focus lens corresponding to each of the at least three evaluated values and calculating the focusing position using the first degree function, and wherein the at least three evaluated values include a maximum value among the evaluated values calculated by the evaluated value calculation step and evaluated values calculated in relation with positions in front and rear of the position of the focus lens corresponding to the maximum value.

* * * * *